United States Patent [19]
Churchill

[11] 4,086,475
[45] Apr. 25, 1978

[54] TICKET TAKING SYSTEM

[76] Inventor: William M. Churchill, 220-15 43rd Ave., Bayside, N.Y. 11361

[21] Appl. No.: 719,250

[22] Filed: Aug. 31, 1976

[51] Int. Cl.² ........................ G06K 5/00; G08G 1/14
[52] U.S. Cl. .................................. 235/419; 340/51
[58] Field of Search .............. 235/61.7 B, 61.7 R, 235/61.8 R, 61.8 A, 61.6 R; 194/4 R, 4 E; 340/51, 149 R, 149 A

[56] References Cited
U.S. PATENT DOCUMENTS

| | | | |
|---|---|---|---|
| 3,221,304 | 11/1965 | Enikeieff et al. | 235/61.7 R |
| 3,356,021 | 12/1967 | May et al. | 235/61.8 A |
| 3,531,625 | 9/1970 | Mizuta et al. | 235/61.7 R |
| 3,609,300 | 9/1971 | Halpern | 235/61.7 R |
| 3,700,859 | 10/1972 | Laurer et al. | 235/61.7 R |
| 3,775,593 | 11/1973 | Gieringer et al. | 235/61.8 A |

*Primary Examiner*—Daryl W. Cook
*Attorney, Agent, or Firm*—Daniel Jay Tick

[57] ABSTRACT

A severable ticket-type entry item for admission to an event attended by a plurality of people has a magnetic code indication. A detector detects the magnetic code indication of the entry item and produces an input electrical signal varying in accordance with the magnetic code indication. An identifying device has a variable predetermined code electric signal recorded therein. The identifying device is electrically connected to the detecting device and compares the input and code signals and produces an acceptance signal when the signals are the same and a rejection signal when the signals are different. A severing device electrically connected to the identifying device severs the entry item to provide a stub part for the holder thereof and a record part for recorded entry data on the entry item when the identifying device produces an acceptance signal. A rejecting device electrically connected to the identifying device and to the severing device prevents severance of the entry item and returns the entire entry item when the identifying device produces a rejection signal.

8 Claims, 11 Drawing Figures

| CODE SCHEDULE | | | | | | |
|---|---|---|---|---|---|---|
| | OCCUPIED BANDS | | | (FOR ADMITTANCE) MASTER REMOTE CONTROL SELECTOR SWITCH CODE SETTING SCHEDULE | | |
| EVENT NUMBER | BAND | | | ROW A | ROW B | ROW C | ROW D |
| | Aa | Ba | Ca | | | | |
| CLOSED | | | | 0 | 0 | 0 | N/A |
| 1 | ■ | | | 1 | 1 | 1 | △ |
| 2 | | ■ | | 0 | 1 | 1 | |
| 3 | | | ■ | 0 | 0 | 1 | |
| 4 | ■ | ■ | | 1 | 2 | 2 | |
| 5 | ■ | ■ | ■ | 1 | 2 | 3 | |
| 6 | | ■ | ■ | 0 | 1 | 2 | ▽ |
| 7 | ■ | | ■ | 1 | 1 | 2 | N/A |

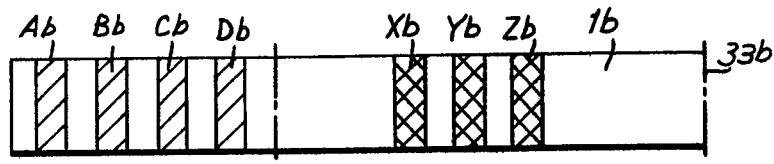
FIG.6
| CODE SCHEDULE | | | | | | |
|---|---|---|---|---|---|---|
| EVENT NO. | BAND DISTRIBUTION | | | | SWITCH SETTING | |
| | Ab | Bb | Cb | Db | Ab Bb Cb Db | |
| CLOSED | | | | | 0 0 0 0 | |
| 1 | ■ | | | | 1 1 1 1 | |
| 2 | | ■ | | | 0 1 1 1 | |
| 3 | | | ■ | | 0 0 1 1 | |
| 4 | | | | ■ | 0 0 0 1 | |
| 5 | ■ | ■ | | | 1 2 2 2 | |
| 6 | ■ | ■ | ■ | | 1 2 3 3 | |
| 7 | ■ | ■ | ■ | ■ | 1 2 3 4 | |
| 8 | | ■ | ■ | | 0 1 2 2 | |
| 9 | | ■ | ■ | ■ | 0 1 2 3 | |
| 10 | | | ■ | ■ | 0 0 1 2 | |
| 11 | ■ | | | ■ | 1 1 2 2 | |
| 12 | | ■ | | ■ | 0 1 1 2 | |
| 13 | ■ | ■ | | ■ | 1 2 2 3 | |
| 14 | ■ | | ■ | ■ | 1 1 2 3 | |
| 15 | ■ | | | ■ | 1 1 1 2 | |
FIG.7
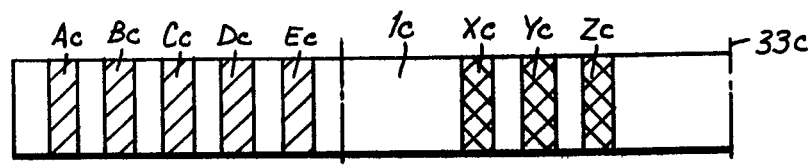
FIG.8

FIG.9

| EVENT NO. | BAND DISTRIBUTION Ac Bc Cc Dc Ec | SWITCH SETTING |||||
|---|---|---|---|---|---|---|
| | | Ac | Bc | Cc | Dc | Ec |
| CLOSED | | 0 | 0 | 0 | 0 | 0 |
| 1 | | 1 | 1 | 1 | 1 | 1 |
| 2 | | 0 | 1 | 1 | 1 | 1 |
| 3 | | 0 | 0 | 1 | 1 | 1 |
| 4 | | 0 | 0 | 0 | 1 | 1 |
| 5 | | 0 | 0 | 0 | 0 | 1 |
| 6 | | 1 | 2 | 2 | 2 | 2 |
| 7 | | 1 | 2 | 3 | 3 | 3 |
| 8 | | 1 | 2 | 3 | 4 | 4 |
| 9 | | 1 | 2 | 3 | 4 | 5 |
| 10 | | 0 | 1 | 2 | 2 | 2 |
| 11 | | 0 | 1 | 2 | 3 | 3 |
| 12 | | 0 | 1 | 2 | 3 | 4 |
| 13 | | 0 | 0 | 1 | 2 | 2 |
| 14 | | 0 | 0 | 1 | 2 | 3 |
| 15 | | 0 | 0 | 0 | 1 | 2 |
| 16 | | 1 | 1 | 2 | 2 | 2 |
| 17 | | 1 | 1 | 2 | 3 | 3 |
| 18 | | 1 | 1 | 2 | 3 | 4 |
| 19 | | 1 | 1 | 1 | 2 | 2 |
| 20 | | 1 | 1 | 1 | 2 | 3 |
| 21 | | 1 | 1 | 1 | 1 | 2 |
| 22 | | 0 | 1 | 1 | 2 | 2 |
| 23 | | 0 | 1 | 1 | 2 | 3 |
| 24 | | 0 | 0 | 1 | 1 | 2 |
| 25 | | 1 | 1 | 2 | 2 | 3 |
| 26 | | 1 | 1 | 1 | 2 | 2 |
| 27 | | 1 | 1 | 1 | 2 | 3 |
| 28 | | 1 | 2 | 2 | 3 | 3 |
| 29 | | 1 | 2 | 2 | 3 | 4 |
| 30 | | 1 | 1 | 1 | 1 | 2 |
| 31 | | 1 | 2 | 2 | 2 | 3 |

CODE SCHEDULE

TICKET TAKING SYSTEM

BACKGROUND OF THE INVENTION

The present invention relates to a ticket taking system.

A person wishing to attend a public event, or one attended by a plurality of people, purchases a ticket prior to the event. The ticket usually consists of paper, pasteboard or paper type material, or the like. The ticket is classified in accordance with the number and/or date of the event, price and the exact seat in the public place such as, for example, the stadium arena, theatre, auditorium, or the like, to which the ticket entitles the ticket holder to enter. The ticket holder enters the stadium, arena, theatre, auditorium, or the like, by moving through a standard turnstile. An attendant, tending the turnstile, takes the ticket, verifies the identification of the event on the face of the ticket, tears the ticket in half, and returns the half of the ticket which indicates the exact location of the seat represented by the ticket, to the patron or ticket holder. The attendant retains the other half of the ticket, which identifies the event and the date, and deposits it in a container such as a basket, bin, box, or the like. The patron then passes through the turnstile and the mechanical counter of the turnstile increases its count by one.

The ticket taking system of the invention provides rapid, verified and unsupervised entry to public events held in stadiums, arenas, theatres, auditoriums, exhibition halls, race tracks, and the like, and provides entry to all types of mass transportation, as well, without the use of coins, tokens, and without the need for attendants. The ticket holder is required to retain a check for determining the exact seat location. The check also functions as a rain check in the event that the event is cancelled, due to rain, or the like. The check provides a receipt for the patron, and, in the case of a racing event, functioning as a wagering receipt. The ticket taking system of the invention provides such a check for a person having a properly designated ticket. Furthermore, the ticket taking system of the invention provides a rapid and accurate inventory of monetary receipts and people admitted to the event, due to the retention of part of each accepted ticket. Any suitable counting and sensing system may be utilized to provide an updated account of monetary receipts and people admitted to the event.

The principal object of the invention is to provide a ticket taking system which functions fully automatically to accept properly encoded tickets for an event attended by a plurality of people and to reject improperly encoded tickets for such event in a fully automated manner.

An object of the invention is to provide a ticket taking system which completely replaces human ticket takers and overseers and requires only a single overseer or attendant.

Another object of the invention is to provide a ticket taking system of simple structure, which is inexpensive in manufacture, and functions efficiently, effectively and reliably to accept properly coded tickets for an event attended by a plurality of people and to admit the holders of such tickets, and to reject improperly coded tickets to such event and to prevent the entry of the holders of such tickets.

Still another object of the invention is to provide a ticket taking system which is adjustable to determine the proper encoding of an acceptable ticket, accepts such properly encoded tickets and admits their holders, rejects improperly encoded tickets and refuses entry to their holders, and which may thus be varied in code designation for each event and for different dates, thereby preventing a single ticket from being utilized for more than the event for which it was issued.

Yet another object of the invention is to provide a ticket taking system which functions efficiently, effectively and reliably to admit holders of properly coded tickets and bar entry to holders of improperly coded tickets, which in barring entry to a holder of an improperly coded ticket indicates that the ticket holder should consult with an attendant, and which in passing the holder of a properly coded ticket indicates that such holder should enter.

Another object of the invention is to provide a ticket taking system which provides a ticket holder admitted to an event with part of the ticket used to gain admittance, which part functions to provide information for locating the seat represented by the ticket, functions as a rain check in the event of cancellation of the event, and functions as a receipt for the amount paid for the ticket, and also retains another part of the ticket as part of an inventory of monetary receipts and the number of patrons admitted to the event.

BRIEF SUMMARY OF THE INVENTION

The ticket taking system of the invention completely eliminates the need for a ticket-taker attendant. The ticket utilized with the ticket taking system of the invention may comprise paper, pasteboard, compressed paper, or any suitable material having magnetic bands provided therein, or thereon, in a predetermined array in spaced mutual relation extending transversely across the ticket. The array of magnetic bands and spaces provides a great number of various code combinations to provide a code which indicates the event and the date and place of the event to which the ticket entitles the bearer admittance. Each ticket bears a magnetic code of the day consisting of a combination of magnetic bands for a specific event on a specific date.

In essence, the ticket taking system of the invention provides three basic functions which a ticket-taker attendant would normally perform. The ticket taking system of the invention reads the code on the ticket. If the ticket is properly encoded, the ticket taking system of the invention severs the ticket and leaves a stub for the ticket holder or patron. The stub indicates where the seat represented by the ticket is located. The system retains the remainder of the ticket to provide an inventory of monetary receipts and patrons for a specific event on a specific date at a specific place. If the ticket is improperly encoded, the ticket is rejected and the patron is denied entry to the event. The patron is directed to inquire of a nearby attendant as to why entry was denied. In such event, the system ejects the ticket without severing it.

The ticket taking system of the invention includes a turnstile and a suitably identified ticket insertion slot. When the ticket is inserted properly, it comes to rest at a predetermined point, so that the patron feels that it can go no further. At such point, approximately two thirds of the length of the ticket extends in the housing of the system beyond the ticket insertion slot, and one third of the length of the ticket protrudes from the slot and extends outside the housing of the system. If the ticket is properly coded, it means that the code correctly identifies the ticket as being for the particular place, on the particular date, and for the particular event for which it is submitted.

If the ticket is properly coded, the ticket taking system of the invention cuts or severs the ticket in the vicinity of the slot, so that the one third thereof protruding from the slot remains in the hand of the patron and functions as a seat location indicator, receipt and rain check for such patron. At the same time, the system releases the locking circuit of the entry gate or turnstile and visually advises the patron that he or she is free to pass through such gate or turnstile. As the patron is passing through the gate or turnstile, the ticket cutter remains in its closed position, blocking the entry of the next-successive ticket from insertion until the previous patron has passed through the gate. A position switch of the gate or turnstile then releases the cutter lock thereby permitting the cutter to be released and to clear the ticket insertion slot. The system then counts one ticket and the gate or turnstile counts one patron by any suitable counter coupled to the gate so that each time a person is admitted, the count increases by "1".

If the ticket is improperly coded, which means that it is not a ticket utilized with the system of the invention, or a counterfeit ticket, or a ticket for the wrong date, or the wrong place, and/or the wrong event, the ticket taking system determines that the ticket is improper, and bars entry of the patron through the entry gate by maintaining the entry gate locking circuit energized. The patron is visually advised by the system that the reason for the refusal of admittance will be provided by an attendant, and advises the security officers in the area to approach the gate at which the ticket was rejected. The entire ticket is returned to the ticket holder.

In accordance with the invention, a ticket taking system comprises a severable ticket-type entry item for admission to an event attended by a plurality of people. The entry item has a magnetic code indication. A detecting device detects the magnetic code indication of the entry item and produces an input electric signal varying in accordance with the magnetic code indication. An identifying device has a variable predetermined code electric signal recorded therein. The identifying device is electrically connected to the detecting device and compares the input and code signals and produces an acceptance signal when the signals are the same and a rejection signal when the signals are different. A severing device is electrically connected to the identifying device for severing the entry item to provide a stub part for the holder thereof and a record part for recorded entry data on the entry item when the identifying device produces an acceptance signal. A rejecting device electrically connected to the identifying device and to the severing device prevents severance of the entry item and returns the entire item when the identifying device produces a rejection signal.

An entry gate is provided for admission to the event. The entry gate has a locking device electrically connected to the identifying device and to the rejecting device. The locking device is released to release the entry gate for a predetermined period of time for the admittance of a person when the identifying device produces an acceptance signal and is normally closed and is maintained closed when the identifying device produces a rejection signal.

A ticket indexing device electrically connected to the rejecting device and to the detecting device deactivates the detecting device after detection of an entry item and maintains the detecting device deactivated until the next-succeeding entry item is supplied thereto.

An information display device electrically connected to the locking device of the entry gate and electrically connected to the rejecting device visually indicates ENTER when the locking device is released, SEE ATTENDANT when the rejecting device receives a rejection signal from the identifying device, and INSERT TICKET HERE when no entry item is in the detecting device.

An alarm device electrically connected to the rejecting device provides a visual and audible alarm when the rejecting device produces a rejection signal. The ticket indexing device is also electrically connected to the information display device.

The magnetic code indication of the entry item comprises a plurality of spaced independent magnetic areas in a predetermined pattern. The detecting device comprises magnetizing means for magnetizing the magnetic areas of the magnetic code indication and a plurality of spaced magnetic detectors for detecting the magnetized magnetic areas when each of the magnetized areas is simultaneously in operative proximity with a corresponding one of the magnetic detectors.

The identifying device comprises a plurality of stepping relay switches each having a relay energizing winding and a relay contact controlled in position by the relay winding in accordance with the extent of energization of the winding. The relay contacts are stepped in position in accordance with electrical signals supplied to the relay windings thereof. A plurality of code signal switches are electrically connected to each other in a matrix and manually preset in position to provide a path of predetermined pattern through the identifying device whereby the input signal energizes the energizing windings of the stepping relay switches to step the corresponding relay contacts to close the path determined by the plurality of preset switches and thereby close an acceptance signal curcuit when the input signal is the same as the code signal.

The identifying device comprises a code register device having a predetermined binary code signal recorded therein. A signal converter is electrically connected to the detecting device for converting the electrical signal produced by the detecting device to a binary code signal. An input register is electrically connected to the signal converter for storing the converted signal. A comparator electrically connected to the signal converter and to the code register compares the converted signal with the code signal and produces an acceptance signal when the signals are the same and a rejection signal when the signals are different.

BRIEF DESCRIPTION OF THE DRAWINGS

In order that the invention may be readily carried into effect, it will now be described with reference to the accompanying drawings, wherein:

FIG. 6 is a schematic diagram of an embodiment of a four band coded ticket of the ticket taking system of the invention;

FIG. 7 is a four band code schedule for the ticket of the embodiment of FIG. 6;

FIG. 8 is a schematic diagram of an embodiment of a five band coded ticket of the ticket taking system of the invention; and FIG. 9 is a five band code schedule for the ticket of the embodiment of FIG. 8.

DETAILED DESCRIPTION OF THE INVENTION

The ticket taking system of the invention comprises a severable ticket-type entry item or ticket 1 (FIGS. 1 and 2) for admission to an event attended by a plurality of people, a public event, mass transportation, or any event or activity for which a fee must be paid for admittance. The events monitored by the ticket taking system of the invention are any events for which a prepaid ticket may be submitted for admittance. This includes sports events such as, for example, baseball games, football games, basketball games, hockey games, and the like, and any sports exhibition or game, or the like, held in a stadium, arena, body of water, or area, cultural events such as, for example, museum exhibits, exhibits of various types, theatrical and/or musical performances, and the like, performed in a theatre, auditorium, exhibition hall, and the like, races such as, for example, automobile races, horse races, dog races, and the like, mass transportation such as, for example, subways, trains, aircraft, buses, and the like, toll roads, bridges, tunnels and the like.

Figures 4, 5:
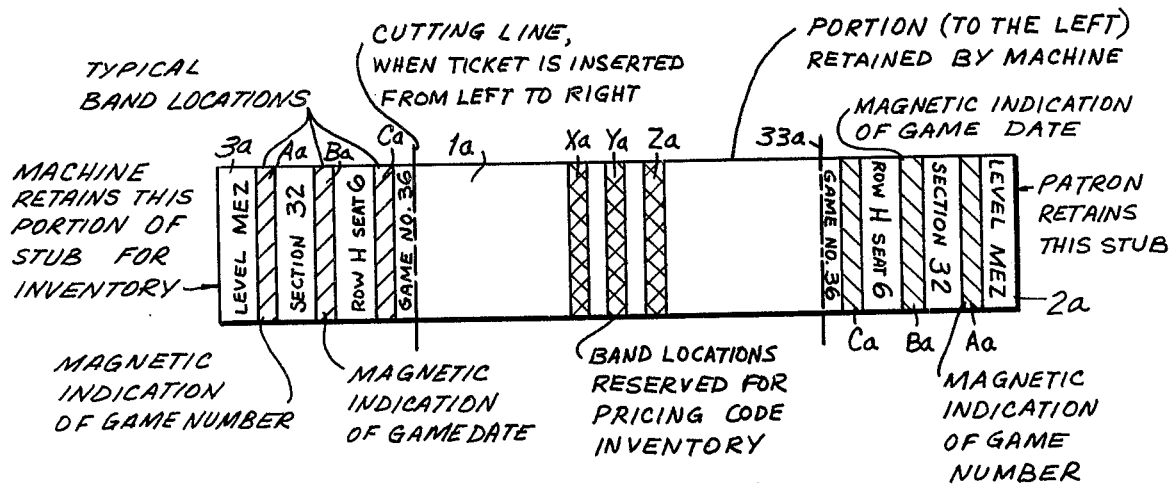
FIG. 4 is a schematic diagram of an embodiment of a three band coded ticket of the ticket taking system of the invention.
FIG. 5 is a three band code schedule for the ticket of the embodiment of FIG. 4.

The entry item or ticket 1 has a magnetic code indication comprising a plurality of spaced independent magnetic areas in a predetermined pattern. Although any suitable pattern may be utilized, a plurality of transverse bands or spaced magnetic areas are provided along the length of the ticket in preferred embodiments thereof, shown in FIGS. 4, 6 and 8 as tickets 1a, 1b and 1c, respectively. FIG. 4 illustrates a three band magnetically coded ticket 1a having spaced opposite first and second ends 2a and 3a. Magnetic bands Aa, Ba and Ca are provided in spaced relation extending transverse to the length of the ticket 1a in the area of the first end 2a thereof. The bands Aa, Ba and Ca identify the location of the seat. The band Aa identifies the number of the event, the band Ba identifies the date of the event, and the band Ca and others identifies the level above the ground of the seat, the section of the stadium or other enclosure in which the event is held and the row and seat number.

The magnetic bands are provided symmetrically about a line dividing the ticket 1 at half its length. Thus, the magnetic code indicating the number of the event, the date of the event, and other data, is provided at both ends of the ticket, so that a ticket may be inserted into a ticket insertion slot, hereinafter described, face up, face down, or either end first.

The same magnetic bands Aa, Ba and Ca are provided in or on the ticket 1a at the second end 3a thereof and extend in the same manner as the bands at the first end 2a thereof. The magnetic bands Aa, Ba and Ca are spaced in accordance with a predetermined magnetic code. Some possible combinations available for the three band magnetic code of the ticket 1a are shown in FIG. 5.

A plurality of transversely extending magnetic bands Xa, Ya and Za provide price inventory information as well as data identifying the place, the event and the date.

Although a three band code is shown in FIGS. 4 and 5, it is basically too simple for use in a stadium, or the like, having a plurality of events or occurrences in a predetermined period of time. Since a considerable number of combinations must be available for a considerable number of events, a ten band magnetic code will most likely be used and would be preferable to any lesser number of bands in the code. The three band code is illustrated for the purpose of simple explanation, rather than practical application.

FIGS. 6 and 7 illustrate, for the purpose of explanation, a four band magnetically coded ticket and code schedule, respectively. FIG. 6 illustrates the two thirds of the ticket 1b which is in the housing of the system during operation, and shows the four magnetic bands Ab, Bb, Cb and Db, as well as the three intermediate magnetic bands Xb, Yb and Zb.

FIGS. 8 and 9 illustrate, for the purpose of explanation, a five band magnetically coded ticket and code schedule, respectively. FIG. 8 illustrates the two thirds of the ticket 1c which is in the housing of the system during operation and shows the five magnetic bands Ac, Bc, Cc, Dc and Ec, as well as the three intermediate magnetic bands Xc, Yc and Zc.

In actuality, more than three, and at least five, intermediate magnetic bands X, Y and Z are utilized to provide the necessary price inventory information as well as data identifying the place, the event and the date.

The ticket 1 may comprise any suitable material of any suitable design such as, for example, paper, pasteboard, or the like, of the type presently used for tickets, having the magnetic bands invisibly provided either on a surface of the ticket, or, preferably, within the ticket itself. In such case, the ticket may be readily manufactured by gluing two or more laminations together after the imposition of the magnetic bands on one or both laminations.

Figure 1:
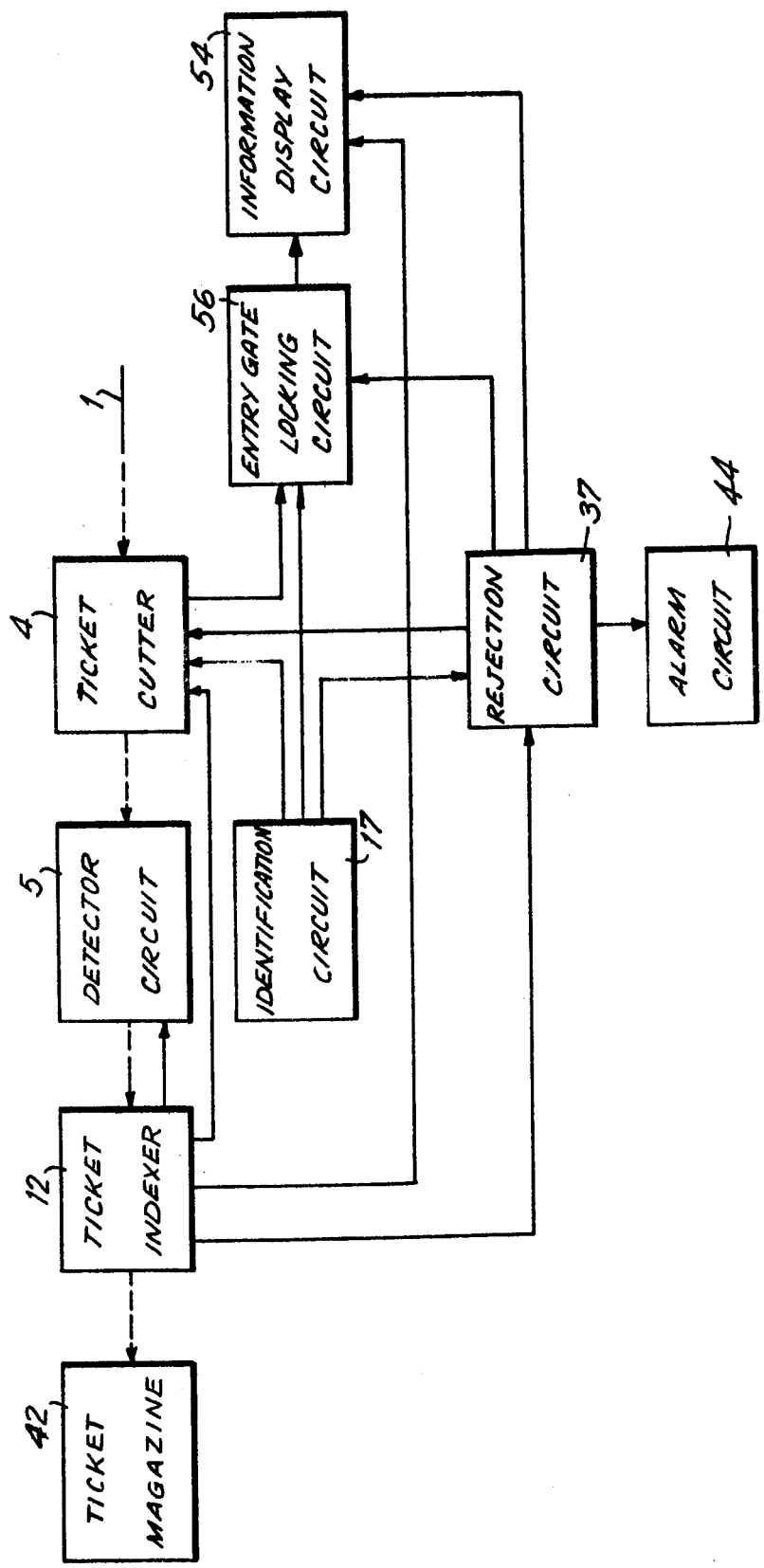
FIG. 1 is a block diagram of the ticket taking system of the invention.
Figure 2A:
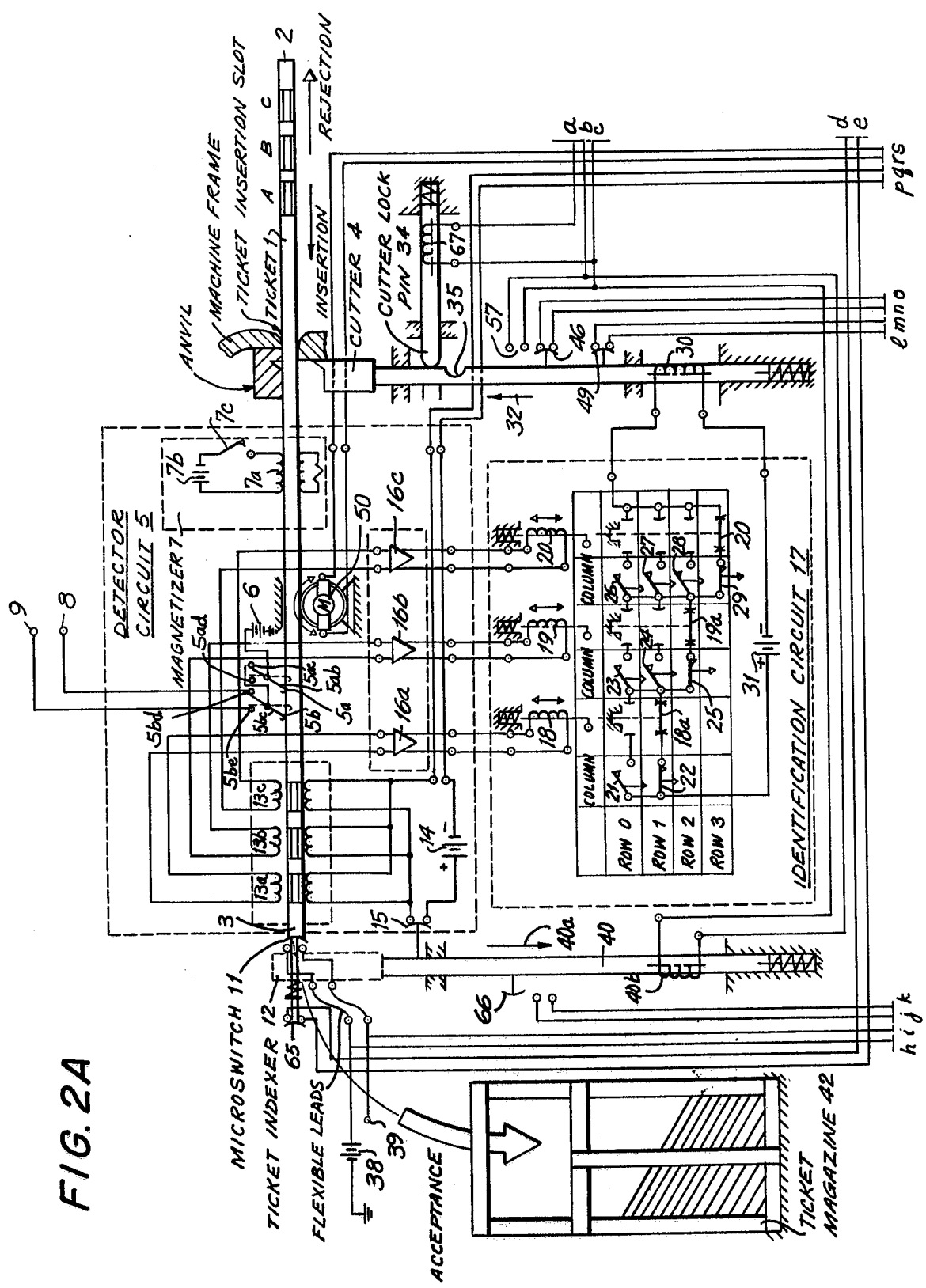
FIG. 2, which is a single FIG. consisting of FIGS. 2A, 2B and 2C, is a circuit diagram of an embodiment of the ticket taking system of the invention.
Figure 2B:
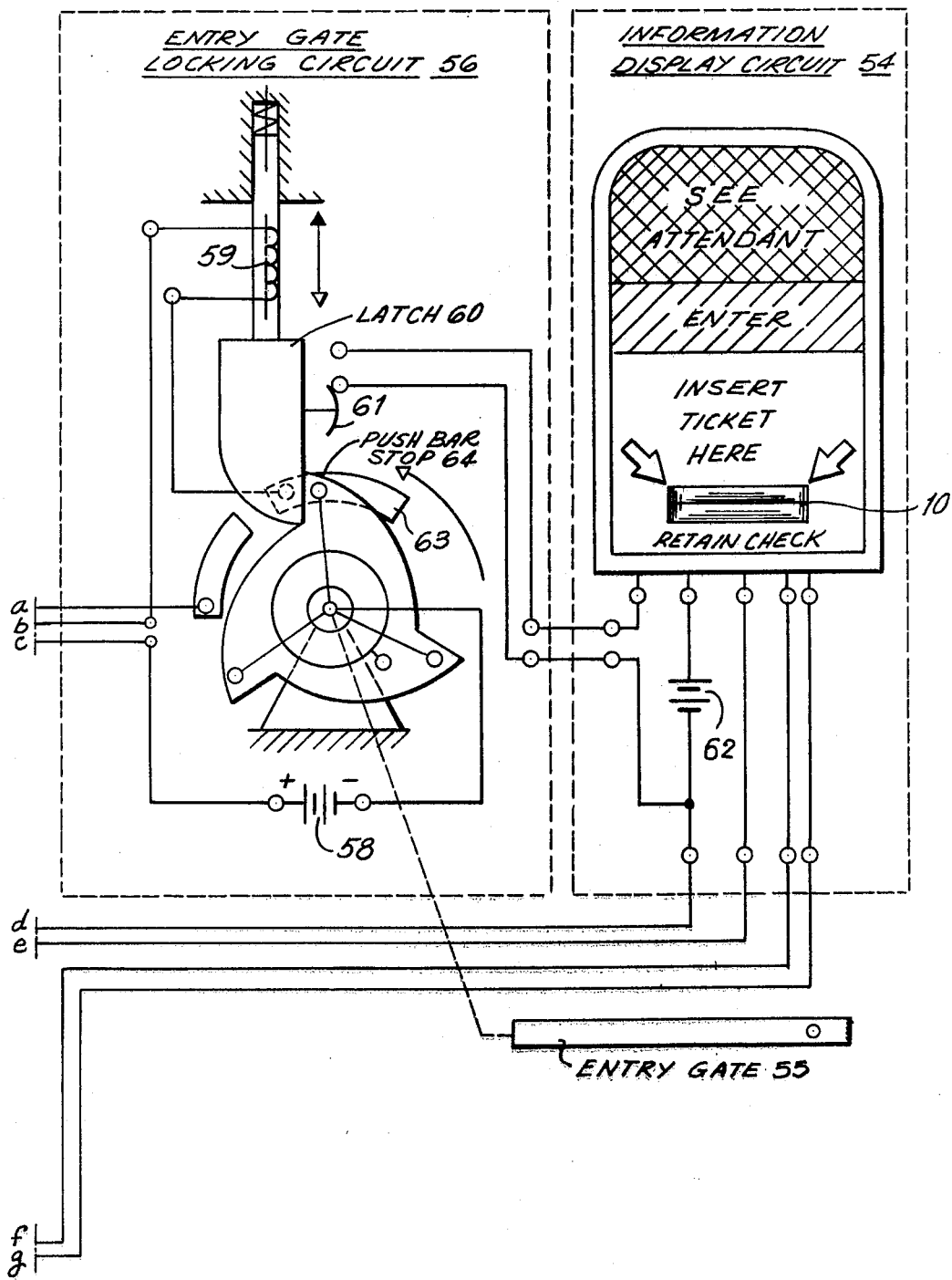
Figure 2C:
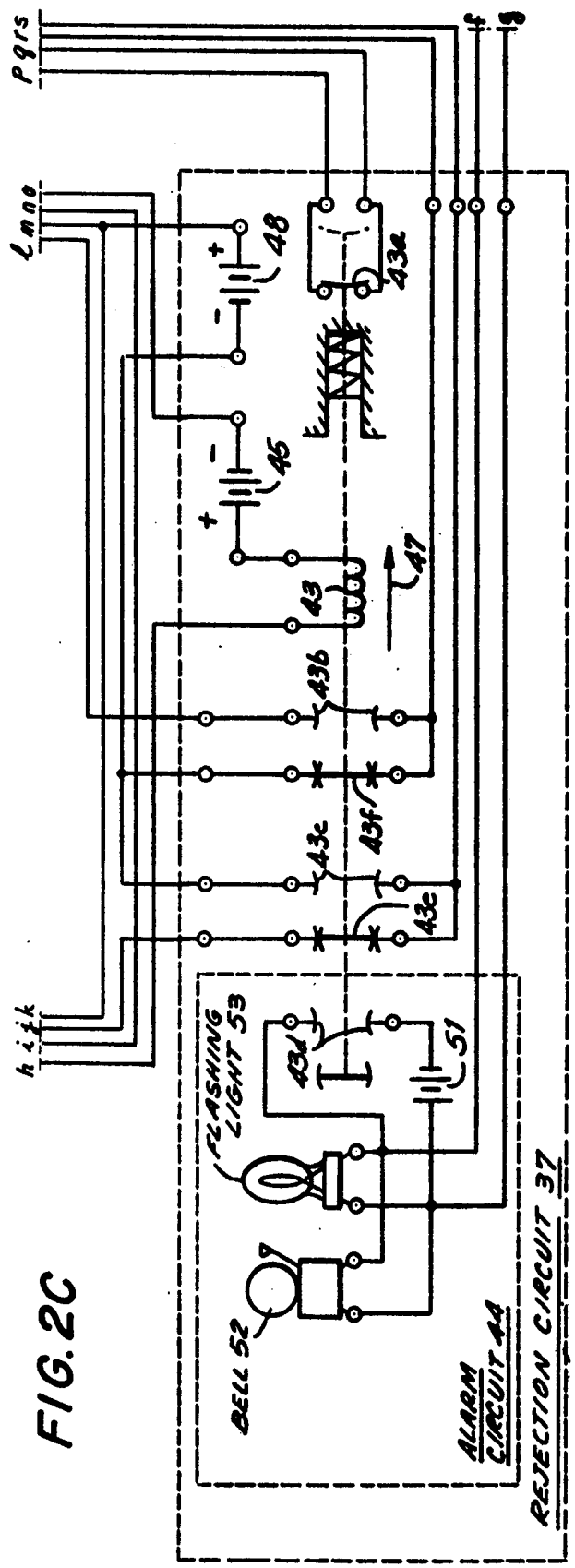

The ticket 1 is first positioned in a ticket cutter or severing device 4 and a detector circuit 5, when it is inserted in the housing of the ticket taking system of the invention (FIGS. 1 and 2). A pair of microswitches 5a and 5b (FIG. 2) driven by simple mechanical arms, levers or rollers, are free to pivot freely about pivot pin mounts. The microswitches 5a and 5b are positioned along the path of the ticket 1 in the detector cutter 5 in a manner whereby each ticket is in operative contact with said microswitches during the insertion of the ticket, the acceptance of the ticket or the rejection of the ticket.

The microswitches 5a and 5b function as a trigger for the identification circuit 17. An alternate trigger for the identification circuit 17 may comprise a leading magnetic band on each ticket.

The microswitch 5a has a switch arm 5ab and a pair of electrical contacts 5ac and 5ad. The arm 5ab is pivotally mounted in a manner whereby in the absence of a ticket 1 in the detector circuit 5, said arm is in its first position, shown by broken lines in FIG. 2, and makes electrical contact with its contact 5ad. In the presence of a ticket 1 in the detector circuit 5, the arm 5ab is in its second position, shown by a solid line in FIG. 2, and makes electrical contact with its contact 5ac.

The microswitch 5b has a switch arm 5bc and a pair of electrical contacts 5bd and 5be. The arm 5bc is pivotally mounted in a manner whereby in the presence of a ticket 1 in the detector circuit 5, said arm is in its second position, shown by a solid line in FIG. 2, and makes electrical contact with its contact 5bd. *In the absence of a ticket 1 in the detector circuit 5, the switch arm 5bc is in its first position, shown by broken lines in FIG. 2, and makes electrical contact with its contact 5be.*

The pivot pin of the switch arm 5ab of the microswitch 5a is electrically connected to the positive polarity terminal of a battery 6. The negative polarity terminal of the battery 6 is connected to a point at ground potential. The pivot pin of the switch arm 5bc of the microswitch 5b is electrically connected to the contact 5ac of the microswitch 5a.

The detector circuit 5 detects the magnetic code indication of the entry item or ticket 1 and produces an input electric signal varying in accordance with said magnetic code indication. As shown in FIG. 2, the detector circuit 5 includes a magnetizer 7 comprising a coil 7a energized by a battery 7b via a switch 7c. The magnetizer 7 produces energizing magnetic fields. The contact 5bd of the microswitch 5b is electrically connected to a terminal 8 of the detector circuit 5, which also functions as the terminal 8 of the identification circuit. The contact 5be of the microswitch 5b is electrically connected to a terminal 9 of the detector circuit 5, which also functions as the terminal 9 of the identification circuit. When the ticket 1 is inserted into the housing of the ticket taking system via a ticket insertion slot 10, shown in FIG. 2, it first passes through the magnetizer 7, so that said magnetizer magnetizes the magnetic bands of said ticket.

When the ticket is properly indexed, with its second short edge 3 pressed against a microswitch 11 of a ticket indexer 12, the magnetic bands of the ticket have passed through the magnetic fields produced by the magnetizer 7 and have been activated and have passed on to a plurality of detectors 13a, 13b and 13c of the detector circuit. Each of the detectors 13a, 13b and 13c comprises a coil or winding which produces a magnetic field and which functions as an inductor. Thus, when the ticket 1 is properly positioned with its second end 3 in abutment with the microswitch 11, each of the three magnetic bands, assuming for the sake of simple illustration that a three magnetic band code is utilized and that each of the three bands is utilized, is positioned in correspondence with its appropriate coil 13a, 13b and 13c, respectively.

The coils 13a, 13b and 13c are energized by a battery 14 via a switch 15. The steady state current flowing through the coils 13a, 13b and 13c varies in accordance with whether or not the band of the ticket corresponding to the coil is magnetized or not. If the bands of the ticket are magnetized and left as spaces in a predetermined array, in accordance with the predetermined code for a particular date and a particular event, indicating that the magnetic code is proper for a particular event, the magnitude of the current flowing through the corresponding coil 13a, 13b or 13c of the detector circuit 5 varies in accordance with the array or pattern. If the sequence or pattern of magnetized bands and spaces is incorrect for a particular event on a particular date, the magnitude of the current flowing through the corresponding coil of the detector circuit 5 is not affected. Thus, for event number 25, for example, as shown in FIG. 9, the magnetic code of five bands Ac, Bc, Cc, Dc and Ec consists of a magnetized band, a space, a magnetized band, a space and a magnetized band, respectively, and provides a switch setting 11223.

The variation in the steady state current flow through the coil 13a, 13b and 13c of the detector circuit 5 is evidenced by a discrete pulse. That is, when the code band of the ticket corresponding to the coil 13a, 13b or 13c is magnetized, indicating that such band is part of the code indication, said coil produces a pulse. A plurality of amplifiers 16a, 16b and 16c are provided. Each of the amplifiers 16a, 16b and 16c is connected to a corresponding one of the coils 13a, 13b and 13c and amplifies the pulse produced by said coil when a magnetized magnetic band of the ticket 1 appears in correspondence therewith. The switch 15 is affixed to the ticket indexer 12 and is normally closed and functions to close the energizing circuit of the battery 14 and the coils 13a, and 13b and 13c.

Thus, the detector circuit 5 functions to magnetize the magnetic areas of the magnetic code indication and, via the plurality of spaced magnetic detectors 13a, 13b and 13c, detects the magnetized magnetic areas when each of said magnetic areas is simultaneously in operative proximity with a corresponding one of the magnetic detectors.

Figure 3:
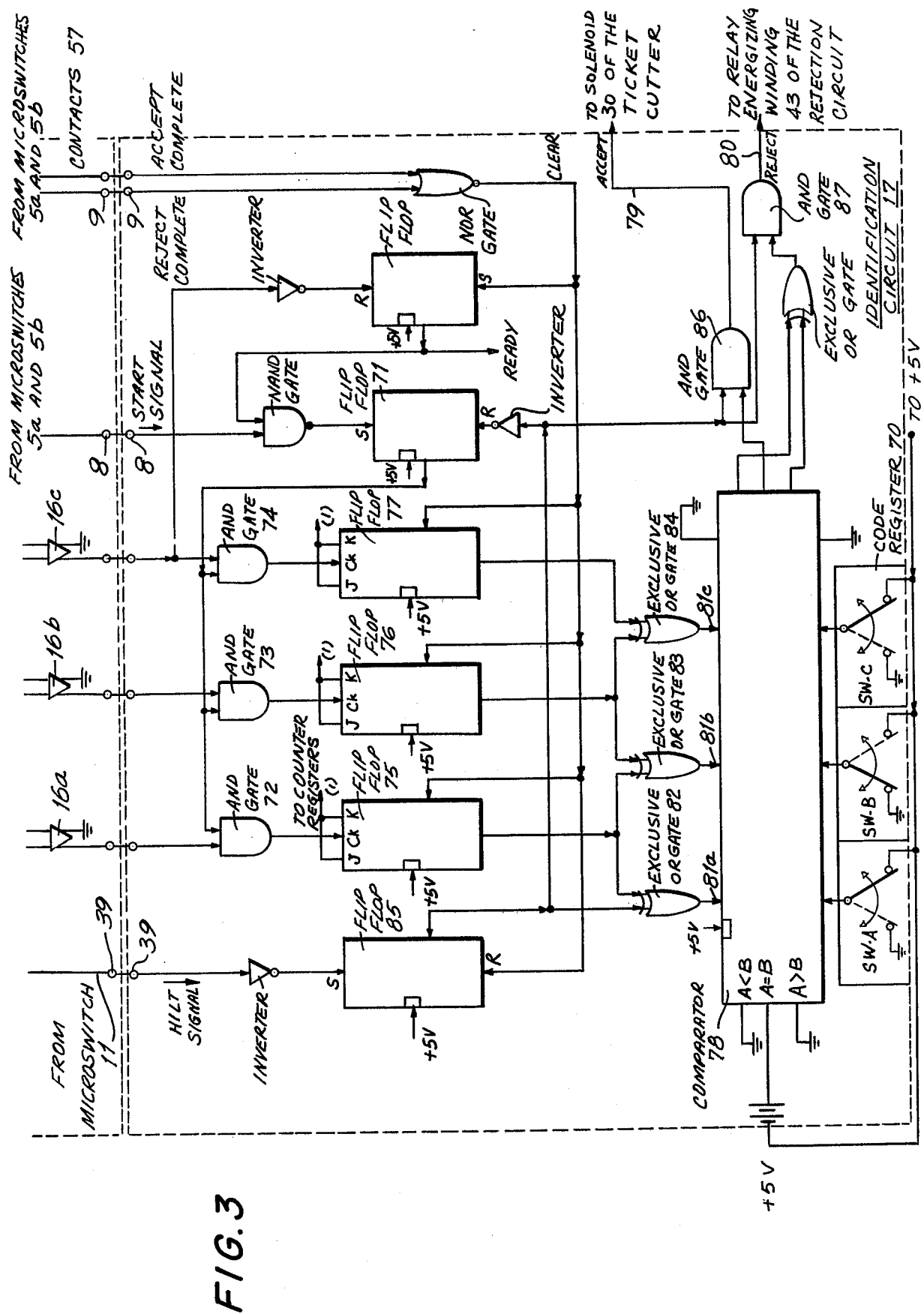
FIG. 3 is a circuit diagram of another embodiment of the identification circuit of the ticket taking system of the invention.

An identification circuit 17 has a variable predetermined code electric signal recorded therein. The identification circuit 17 is electrically connected to the detector circuit 5 and compares the input and code signals. The identification circuit 17 produces an acceptance signal when the signals are the same and a rejection signal when the signals are different. The embodiment of FIG. 2 of the identification circuit 17 is an electromechanical circuit whereas the embodiment of the identification of FIG. 3 is an electronic circuit.

The identification circuit 17 of the embodiment of FIG. 2 comprises a plurality of stepping relay switches positioned in columns. The first stepping relay switch has a relay energizing winding 18 and a relay contact 18a controlled in position by said relay energizing winding in accordance with the extent of energization of said winding. The second stepping relay which has a relay energizing winding 19 and a relay contact 19a controlled in position by said relay energizing winding in accordance with the extent of energization of said winding. The third stepping relay switch has a relay energizing winding 20 and a relay contact 20a controlled in position by said relay energizing winding in accordance with the extent of energization of said winding. The relay contacts 18a, 19a and 20a are stepped in position in accordance with electrical signals supplied to the relay energizing windings 18, 19 and 20, respectively, thereof.

In the identification circuit 17 of FIG. 2, a plurality of code signal switches 21, 22, 23, 24, 25, 26, 27, 28 and 29 are electrically connected to each other in a matrix and are manually preset in position to provide a path of predetermined pattern through said identification circuit. The relay energizing windings 18, 19 and 20 of the stepping relay switches are electrically connected to the amplifiers 16a, 16b and 16c, respectively, of the detector circuit 5. Thus, the input signal, which is produced upon the detection of an energized magnetic band by a detector coil 13a, 13b or 13c of the detector circuit 5, energizes the relay energizing windings 18, 19 and 20 of the stepping relay switches to step the corresponding relay contacts 18a, 19a and 20a, respectively, to close the circuit path determined by the plurality of preset switches 21 to 29 and thereby close an acceptance signal circuit 30 (FIG. 2) when the input signal is the same as the code signal.

As shown in FIG. 2, the first column of the identification circuit 17 has two code signal switches 21 and 22 therein, the second column has three code signal switches 23, 24 and 25 therein, and the third column has four code signal switches 26, 27, 28 and 29 therein. In the example illustrated in FIG. 2, the code is assumed to be a simple one, two, three, so that the code signal switches 22, 25 and 29 are closed when the identification circuit 17 is adjusted for operation for a particular event at a particular time and place to be identified by the code one, two, three. Thus, tickets bearing magnetized bands of such order are accepted by the detector circuit 5 and result in the energization of the relay energizing windings 18, 19 and 20 to step the relay contacts 18a, 19a and 20a, respectively, to their positions shown in FIG. 2 to close the circuit path set by the code signal switches 22, 25 and 29.

As shown in FIG. 2, the acceptance circuit 30 is a solenoid coil which is energized by a current flow when the predetermined code, as set in the identification circuit 17, is met by the magnetized bands of the ticket 1, as detected by the detector circuit 5. When the magnetizable bands of the ticket 1 do not conform with the code preset in the identification circuit 17, there is no current flow through the coil 30. The current which flows through the coil 30 of the solenoid is provided by a battery 31. The solenoid 30 operates the ticket cutter 4. When the solenoid winding 30 is energized by a current flow from the battery 31, due to correspondence between the code on the ticket 1 and the code preset in the identification circuit 17, said solenoid winding drives the cutter 4 upward in the direction of an arrow 32, to sever said ticket along the broken lines 33a, 33b and 33c of FIGS. 4, 6 and 8, respectively.

When the ticket 1 is severed by the cutter 4, a cutter lock pin 34 moves into engagement with a notch 35 in the stem 36 of said cutter, due to spring action, and locks said cutter in its severing position. If an improperly coded ticket 1 is inserted into the ticket insertion slot 10 of the ticket taking system of the invention, the detector circuit 5 does not properly index or energize the stepping relay switches, or, more particularly, the energizing relay windings 18, 19 and 20 thereof, and there is no closing of a current path through the identification circuit 17. Thus, there is no current flow through the solenoid 30 and the cutter 4 is not energized, so that the ticket 1 is not severed. In such case, a rejection circuit 37 operates to eject the ticket 1 from the housing of the system.

In order to start the operation of the identification circuit 17, a HILT signal must be received by said circuit to indicate that the ticket 1 is in proper position to be read. The microswitch 11 provides the HILT signal upon depression of said microswitch by the end or leading edge 3 of the ticket 1 due to abutment of said microswitch by said ticket. A battery 38 has its positive polarity terminal connected to one contact of the microswitch 11 and its negative polarity terminal connected to a point at ground potential. The other contact of the microswitch 11 is connected to a terminal 39 of the detector circuit 5, which also functions as the terminal 39 of the identification circuit 17.

When the microswitch 11 is closed by abutment of the leading edge 3 of the ticket 1 it closes the circuit of the battery 38 to the terminal 39 of the identification circuit 17 (FIG. 3), thereby providing the HILT signal.

In order to index the identification circuit 17, after the next-preceding acceptance or rejection operation, a START signal and a coincidental acceptance or rejection signal must be supplied to properly reset the counter registers of said identification circuit (FIG. 3).

The microswitches 5a and 5b trigger the identification circuit 17 of FIG. 3. When a ticket 1 abuts the switch arm 5ab of the microswitch 5a, it rotates said switch arm clockwise from its first position to its second position and passes under said switch arm. When the ticket 1 abuts the switch arm 5bc of the microswitch 5b, it rotates said switch arm clockwise from its first position to its second position and passes under said switch arm. When a ticket is not present, the switch arms 5ab and 5bc of the microswitches 5a and 5b remain in their first positions.

When the ticket 1 passes under the switch arm 5bc of the microswitch 5b, said switch arm makes electrical contact with the contact 5bd of said microswitch, in its second position, and closes the circuit of the battery 6 to the terminal 8 of the identification circuit 17 (FIG. 3) via 5ab, 5ac, 5bc, and 5bd, thereby providing the START signal.

The severing device or ticket cutter 4 is thus electrically connected to the identification circuit 17 via the solenoid winding 30, and functions to sever the ticket 1 to provide a stub part, constituting approximately one third of the length of the ticket, to the right of the broken line 33a in FIG. 4 for the patron or ticket holder to retain, and a record part, constituting the remaining two thirds of the length of the ticket, to the left of said broken line, as shown in FIG. 4, for recording entry data on the ticket when the identification circuit 17 produces an acceptance signal.

As shown in FIG. 2, the ticket indexer 12 is electrically connected to the rejection circuit 37 and to the detector circuit 5, and functions to deactivate said detector circuit after detection of an entry item or ticket 1 and to maintain said detector circuit deactivated until the next-succeeding ticket is supplied thereto. When the ticket indexer 12, as shown in FIG. 2, is activated, its stem 40 moves in the direction of an arrow 40a due to the energization of its solenoid 40b. When the stem 40 of the ticket indexer 12 moves in the direction of the arrow 40a, the normally closed switch 15 thereof is opened, thereby opening the detector circuit 5. This prevents further indexing of the stepping relay switches of the identification circuit 17 after the magnetic bands of the ticket 1 pass the various detector coils as the ticket is moved in the direction of an arrow 41, out of the housing of the ticket taking system of the invention and into a ticket magazine, container, storage box, or the like, 42. When the ticket 1 is rejected, normally closed contacts 43a of a stepping relay switch of the rejection circuit having a relay energizing winding 43 are opened. This prevents further indexing of the stepping relay switches of the identification circuit 17 by opening the detector circuit 5.

If the ticket 1 is accepted, so that it moves in the direction of the arrow 41 (FIG. 2) to the ticket magazine 42 (FIG. 2), the microswitch 5a is opened, moves to its first position, shown by broken lines in FIG. 2, and opens the circuit of the battery 6 by breaking electrical contact of the contact 5ac with the switch arm 5ab. The required acceptance signal is sent to the identification circuit 17 due to the closing of a pair of switch contacts 57, hereinafter described, by the stem 36 of the ticket cutter 4 (FIG. 2).

If the ticket 1 is rejected, and is expelled from the housing of the system, by being moved in the opposite direction from the arrow 41, back to the person who inserted it into said housing, the microswitch 5b moves to its first position before the microswitch 5a does. In the first position of the microswitch 5b, the switch arm 5bc thereof makes electrical contact with the contact 5be thereof thereby directing current from the battery 6 to the terminal 9 of the identification circuit 17, via 5ab, 5ac, 5bc and 5be, to indicate that the rejection is completed. After the ticket 1 moves past the microswitch 5a, the switch arm 5ab of said microswitch moves to its first position, thereby opening the battery 6 circuit by breaking electrical contact between said switch arm and the contact 5ac.

As shown in FIGS. 1 and 2, rejection circuit 37 is electrically connected to the identification circuit 17 and to the ticket cutter 4 and functions to prevent the severance or cutting of the ticket and to return the entire ticket back to the ticket holder or patron when said identification circuit 17 produces a rejection signal. The rejection circuit 37 includes an alarm circuit 44. When the ticket 1 is not properly coded, it activates the rejection circuit 37. In this case, the detector circuit 5 does not correctly index the stepping relay switches of the identification circuit 17. Because of this inaction, and due to the closing of the microswitch 11 by the end 3 of the ticket 1, the circuit of the relay energizing winding 43 and a battery 45 is closed via said microswitch and current is provided by said battery and flows through said relay energizing winding and through a normally closed switch 46, which is controlled by the operation of the cutter 4.

As shown in FIG. 2, when the relay energizing winding 43 of the relay stepping switch of the rejection circuit 37 is energized, said relay stepping switch is moved in the direction of an arrow 47 and current is supplied by a battery 48 via a normally closed switch 49, which is controlled by the ticket cutter 4, via relay contacts 43b of said stepping relay switch to a motor 50 of the detector circuit 5. When the motor 50 is energized by the current from the battery 48, it rotates clockwise and expels the entire ticket 1 out of the housing of the ticket taking system, via the ticket insertion slot 10. The motor 50 energizing circuit is closed through relay contacts 43c of the stepping relay switch of the rejection circuit 37.

As shown in FIG. 2, when the stepping relay switch of the rejection circuit 37 is moved in the direction of the arrow 47 due to the energization of its relay energizing winding 43, it closes electrical relay contacts 43d of said stepping relay switch and thereby closes the alarm circuit 44, whereby a battery 51 electrically energizes an audible alarm 52 such as, for example, a bell and a visual alarm 53 such as, for example, a flashing lamp or a lamp. When the alarm circuit 44 is closed by the stepping relay switch of the rejection circuit 37 via its relay contacts 43d, current is supplied to an information display circuit 54 wherein such current energizes a lamp or lamps to illuminate a translucent and illuminable sign panel which presents the message SEE ATTENDANT.

It is thus seen that the alarm circuit 44, which is electrically connected to the rejection circuit 37, provides a visual or visible and audible alarm when the rejection circuit produces a rejection signal.

An entry gate 55 (FIG. 2) is provided for admission to the event, or more particularly, to the stadium or other enclosure in which the event will occur. The entry gate 55 has an entry gate locking circuit 56 (FIGS. 1 and 2) electrically connected to the identification circuit 17 and to the rejection circuit 37. The entry gate locking circuit 56 is released to release the entry gate or turnstile 55 for a predetermined period of time for the admittance of a person when the identification circuit 17 produces an acceptance signal. The entry gate locking circuit 56 is normally closed to maintain the entry gate or turnstile 55 locked to prevent admittance of a person, and is maintained closed when the identification circuit 17 produces a rejection signal.

As shown in FIG. 2, if a properly coded ticket 1 is inserted into the ticket insertion slot 10 of the housing of the ticket taking system, the aforedescribed circuits function due to the movement of the stem 36 of the ticket cutter 4 in the direction of the arrow 32, which closes a pair of switch contacts 57 via the switch 46. This closes the circuit of a battery 58, so that said battery energizes a solenoid coil 59. The solenoid coil 59 controls the position of a latch 60 which prevents the entry gate or turnstile 55 from being opened. When the latch 60 is raised, due to the energization of the controlling solenoid 59, said latch releases the entry gate 55 and closes a switch 61 thereby closing an energizing circuit wherein a battery 62 energizes the appropriate lamp or lamps of the information display circuit 54 to indicate to the ticket holder that he or she is to ENTER.

As shown in FIG. 2, the mechanism of the entry gate or turnstile 55 includes a wiping switch 63 which retains circuit contact, so that current flows as the wiping switch turns, until a push bar stop 64 of the entry gate or turnstile 55 clears the latch 60, which is in raised position. In the meantime, current flows from the battery 58 to the solenoid 40 of the ticket indexer. When the solenoid 40 of the ticket indexer 12 is energized, it instantaneously releases said ticket indexer and permits the ticket 1 to be driven out of the housing and into the ticket magazine 42. When the wiping switch 63 loses electrical contact with the circuit, the solenoid 59 is deenergized and is moved by its springs back into its locked position in time to connect the next push bar stop 64.

If an improperly coded ticket 1 is inserted into the ticket insertion slot 10, the aforedescribed circuits function in a manner whereby they prevent the operation of the ticket cutter 4. This prevents the release of the entry gate locking gate circuit 56, whereby the entry gate will not permit the passage of the patron.

As shown in FIGS. 1 and 2, the information display circuit 54 is electrically connected to the locking circuit 56 of the entry gate and is electrically connected to the rejection circuit 37. The information display circuit 54, by energizing the appropriate lamps, illuminates and thereby visually indicates, signs directing the patron to ENTER when the locking circuit is released, to SEE ATTENDANT when the rejection circuit receives a rejection signal from the identification circuit 17, and to INSERT TICKET HERE when there is no ticket in the detector circuit 5. The indication requesting that the patron INSERT TICKET HERE has an arrow pointing to the ticket insertion slot 10.

If there is no ticket in the housing of the ticket taking system of the invention, the microswitch 11 is normally open and a normally closed switch 65 of the ticket indexer 12 is in its closed position. The battery 62 of the information display circuit 54 thus energizes the appropriate lamp or lamps for displaying the instruction INSERT TICKET HERE.

If the ticket 1 is properly encoded, the latch 60 of the entry gate locking circuit 56 is raised and causes the normally open switch 61 to close, thereby energizing the appropriate lamp or lamps to illuminate the sign ENTER of the information display circuit 54.

As shown in FIG. 2, when the stepping relay switch of the rejection circuit 37 is in its normal position, which is that indicated in FIG. 2, it closes a circuit for the acceptance procedure. When the stem 38 of the ticket indexer 12 is moved down, in the direction of the arrow 39, due to the energization of the solenoid 40, to permit the ticket 1 to pass into the ticket magazine 42, said stem closes a normally open switch 66. When the switch 66 is closed, the battery 48 provides current through relay contacts 43e of the stepping relay switch of the rejection circuit 37 to the motor 50, which is then driven counterclockwise. When the motor 50 rotates counterclockwise, it moves the ticket 1 in the direction of the arrow 41. The motor energizing circuit is completed via relay contacts 43f of the stepping relay switch of the rejection circuit 37.

The cutter lock pin 34 is controlled in operation by a solenoid 67 which is energized by the battery 58 via the push bar 64, as shown in FIG. 2.

In the embodiment of FIG. 3, the identification circuit 17 is completely electronic. The identification circuit 17 of FIG. 3 comprises a code register 70 having a predetermined binary code signal recorded therein. A signal or code converter comprising a register of flip flop 71 and a plurality of AND gates 72, 73 and 74, is electrically connected to the detector circuit 5 (FIG. 2) for converting the electrical signal produced by said detector circuit to a binary code signal. An input register comprising a plurality of flip flops 75, 76 and 77 is electrically connected to the signal or code converter for storing the converted signal.

A comparator 78 is electrically connected to the signal converter and to the code register 70 and functions to compare the converted signal with the code signal and to produce an acceptance when the signals are the same and a rejection signal when the signals are different.

The identification circuit 17 of FIG. 3 stores in the input register 75, 76, 77 the binary code, in the form of discrete pulses, and compares such code with the preselected or predetermined binary code stored in the code register 70. The acceptance signal is provided on a lead 79 connected to the solenoid 30 of the acceptance circuit and ticket cutter 4 (FIG. 2) when the codes compare, and the rejection signal is provided on a lead 80 connected to the relay energizing winding 43 of the stepping relay switch of the rejection circuit 37 (FIG. 2) when the codes do not compare.

The input register 75, 76, 77 responds to input code pulses produced by the detector circuit 5 in accordance with the magnetized code bands on the ticket 1, and stores a code which is a function of the input code. The signal converter 71, 72, 73, 74 converts the code of the input register to one which is suitable for comparison. The code register 70 enters and stores the preselected code. The comparator 78 compares the input code and the preselected code and provides an output signal indicative of a comparison or non-comparison therebetween.

When a ticket 1 is ejected, the flip flop 71 of the signal converter is set thereby producing a READY signal, and enabling said flip flop to respond to the insertion of the next-succeeding ticket. When the next-succeeding ticket 1 is inserted in the ticket insert slot 10 of the housing of the ticket taking system (FIG. 2), a START signal sets the flip flop 71, which opens the clock inputs to the flip flops 75, 76 and 77 of the input register. As the ticket 1 is inserted into the housing, inputs 81a, 81b and 81c of the comparator 78 are pulsed, as the code of said ticket is sensed by the detector circuit 5.

The flip flops 75, 76 and 77 count the pulses and feed EXCLUSIVE OR GATES 82, 83 and 84, which recover the input code. When the ticket 1 is fully inserted in the housing of the ticket taking system, a HILT signal sets a flip flop 85, which resets the flip flop 71. The flip flop 71 then stops the counting and enables an ACCEPT AND GATE 86 and a REJECT AND GATE 87. The EXCLUSIVE OR GATES 82, 83 and 84 convert the count code back to the original ticket code.

The comparator 78 compares the input code from the ticket 1 with the preselected code from the code register 70 and produces either the acceptance signal, indicating that the ticket code is proper, and causing the ticket to move into the ticket magazine 42 (FIG. 2) or the rejection signal, indicating that the ticket code is improper, and causing the entire ticket to be ejected via the slot 10 (FIG. 2).

The identification circuit of FIG. 3 is supplied with four distinct input signals, as hereinbefore described. The signals are the HILT signal, which indicates that the ticket 1 is properly indexed, the START signal to start the electronic clock, the "acceptance completed" signal to indicate that the next-preceding ticket operation is completed and to reset the system for the present ticket operation, and the "reject completed" signal to indicate the completion of the rejection of the ticket.

As hereinbefore described, when the ticket 1 is accepted, the microswitch 5a is first switched on and then the microswitch 5b is switched on, and the microswitch 5a first switched off and the microswitch 5b is then switched off. When the ticket is rejected, the microswitch 5a is first switched on and then the microswitch 5b is switched on, and the microswitch 5b is first switched off and the microswitch 5a is then switched off.

While the invention has been described by means of specific examples and in specific embodiments, I do not wish to be limited thereto, for obvious modifications will occur to those skilled in the art without departing from the spirit and scope of the invention.

I claim:

1. A ticket taking system, comprising
   a severable ticket-type entry item for admission to an event attended by a plurality of people, said entry item having a magnetic code indication;
   detecting means for detecting the magnetic code indication of the entry item and for producing an input electric signal varying in accordance with said magnetic code indication;
   identifying means having a variable predetermined code electric signal recorded therein, said identifying means being electrically connected to the detecting means and comparing the input and code signals and producing an acceptance signal when said signals are the same and a rejection signal when said signals are different;

severing means electrically connected to the identifying means for severing the entry item to provide a stub part for the holder thereof and a record part for recorded entry data on said entry item when the identifying means produces an acceptance signal; and rejecting means electrically connected to the identifying means and to the severing means for preventing severance of the entry item and for returning the entire entry item when the identifying means produces a rejection signal.

2. A ticket taking system, comprising a severable ticket-type entry item for admission to an event attended by a plurality of people, said entry item having a magnetic code indication;

detecting means for detecting the magnetic code indication of the entry item and for producing an input electric signal varying in accordance with said magnetic code indication;

identifying means having a variable predetermined code electric signal recorded therein, said identifying means being electrically connected to the detecting means and comparing the input and code signals and producing an acceptance signal when said signals are the same and a rejection signal when said signals are different;

severing means electrically connected to the identifying means for severing the entry item to provide a stub part for the holder thereof and a record part for recorded entry data on said entry item when the identifying means produces an acceptance signal;

rejecting means electrically connected to the identifying means and to the severing means for preventing severance of the entry item and for returning the entire entry item when the identifying means produces a rejection signal; and an entry gate for admission to the event, said entry gate having locking means electrically connected to the identifying means and to the rejecting means, said locking means being released to release the entry gate for a predetermined period of time for the admittance of a person when the identifying means produces an acceptance signal and being normally closed and being maintained closed when the identifying means produces a rejection signal.

3. A ticket taking system as claimed in claim 2, further comprising information display means electrically connected to the locking means of the entry gate and electrically connected to the rejecting means for visually indicating ENTER when said locking means is released, SEE ATTENDANT when said rejecting means receives a rejection signal from the identifying means, and INSERT TICKET HERE when no entry item is in the detecting means.

4. A ticket taking system, comprising a severable ticket-type entry item for admission to an event attended by a plurality of people, said entry item having a magnetic code indication;

detecting means for detecting the magnetic code indication of the entry item and for producing an input electric signal varying in accordance with said magnetic code indication;

identifying means having a variable predetermined code electric signal recorded therein, said identifying means being electrically connected to the detecting means and comparing the input and code signals and producing an acceptance signal when said signals are the same and a rejection signal when said signals are different;

severing means electrically connected to the identifying means for severing the entry item to provide a stub part for the holder thereof and a record part for the recorded entry data on said entry item when the identifying means produces an acceptance signal;

rejecting means electrically connected to the identifying means and to the severing means for preventing severance of the entry item and for returning the entire entry item when the identifying means produces a rejection signal; and ticket indexing means electrically connected to the rejecting means and to the detecting means for deactivating the detecting means after detection of an entry item and for maintaining said detecting means deactivated until the next-succeeding entry item is supplied thereto.

5. A ticket taking system, comprising a severable ticket-type entry item for admission to an event attended by a plurality of people, said entry item having a magnetic code indication;

detecting means for detecting the magnetic code indication of the entry item and for producing an input electric signal varying in accordance with said magnetic code indication;

identifying means having a variable predetermined code electric signal recorded therein, said identifying means being electrically connected to the detecting means and comparing the input and code signals and producing an acceptance signal when said signals are the same and a rejection signal when said signals are different;

severing means electrically connected to the identifying means for severing the entry item to provide a stub part for the holder thereof and a record part for recorded entry data on said entry item when the identifying means produces an acceptance signal;

rejecting means electrically connected to the identifying means and to the severing means for preventing severance of the entry item and for returning the entire entry item when the identifying means produces a rejection signal;

an entry gate for admission to the event, said entry gate having locking means electrically connected to the identifying means and to the rejecting means, said locking means being released to release the entry gate for a predetermined period of time for the admittance of a person when the identifying means produces an acceptance signal and being normally closed and being maintained closed when the identifying means produces a rejection signal;

information display means electrically connected to the locking means of the entry gate and electrically connected to the rejecting means for visually indicating ENTER when said locking means is released, SEE ATTENDANT when said rejecting means receives a rejection signal from the identifying means, and INSERT TICKET HERE when no entry item is in the detecting means;

alarm means electrically connected to the rejecting means for providing a visual and audible alarm when said rejecting means produces a rejection signal; and ticket indexing means electrically connected to the rejecting means, the detecting means and the information display means for deactivating the detecting means after detection of an entry item and for maintaining said detecting means deactivated until the next-succeeding entry item is supplied thereto.

6. A ticket taking system as claimed in claim 5, wherein the magnetic code indication of the entry item comprises a plurality of spaced independent magnetic areas in a predetermined pattern and wherein the detecting means comprises magnetizing means for magnetizing the magnetic areas of the magnetic code indication and a plurality of spaced magnetic detectors for detecting the magnetized magnetic areas when each of said magnetized areas is simultaneously in operative proximity with a corresponding one of said magnetic detectors.

7. A ticket taking system as claimed in claim 6, wherein the identifying means comprises a plurality of stepping relay switches each having a relay energizing winding and a relay contact controlled in position by the relay winding in accordance with the extent of energization of said winding, the relay contacts being stepped in position in accordance with electrical signals supplied to the relay windings thereof, and a plurality of code signal switches electrically connected to each other in a matrix and manually preset in position to provide a path of predetermined pattern through said identifying means whereby the input signal energizes the energizing windings of the stepping relay switches to step the corresponding relay contacts to close the path determined by the plurality of preset switches and thereby close an acceptance signal circuit when the input signal is the same as the code signal.

8. A ticket taking system as claimed in claim 6, wherein the identifying means comprises code register means having a predetermined binary code signal recorded therein, signal converting means electrically connected to the detecting means for converting the electrical signal produced by said detecting means to a binary code signal, input register means electrically connected to the signal converting means for storing the converted signal, and comparator means electrically connected to the signal converting means and to the code register means for comparing the converted signal with the code signal and producing an acceptance signal when said signals are the same and a rejection signal when said signals are different.

* * * * *